Oct. 27, 1931.   P. H. CRAGO   1,828,926
CONTROLLING APPARATUS FOR HIGHWAY CROSSING SIGNALS
Filed July 29, 1930

INVENTOR:
P. H. Crago,
by A. R. Vincill
His Attorney

Patented Oct. 27, 1931

1,828,926

UNITED STATES PATENT OFFICE

PAUL H. CRAGO, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

CONTROLLING APPARATUS FOR HIGHWAY CROSSING SIGNALS

Application filed July 29, 1930. Serial No. 471,459.

My invention relates to controlling apparatus for highway crossing signals, that is, to means for the control of signals which are placed at intersections of railways and highways for the purpose of warning users of the highway when a train is approaching.

One feature of my invention is the provision of means for correctly controlling a highway crossing signal for a track on which trains move in both directions, if conditions are such that the two track sections which control the signal cannot extend through the highway crossing but are separated from each other at the crossing by a section of track which is longer than a single car or a light engine.

I will describe two forms of apparatus embodying my invention, and will then point out the novel features thereof in claims.

Figure 1:
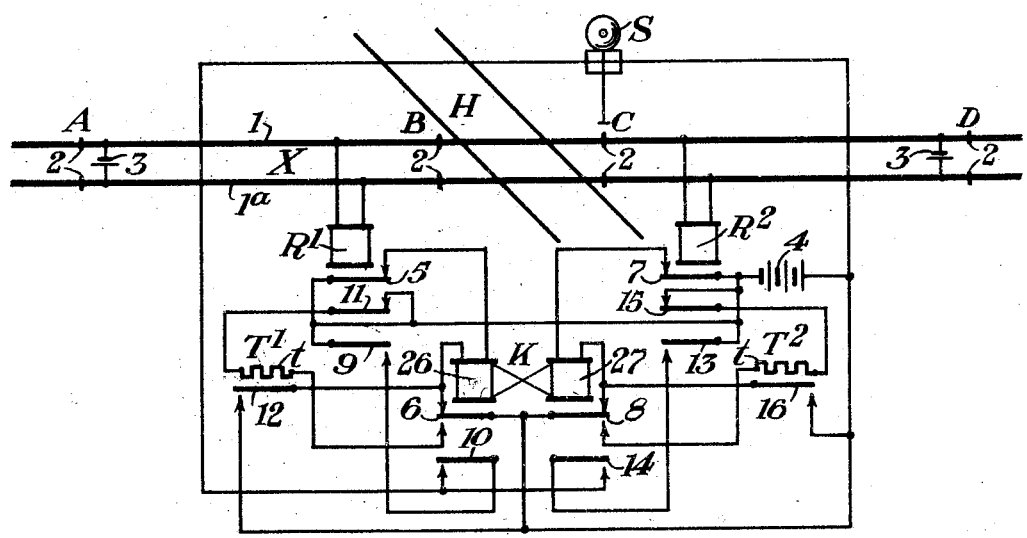
Figure 2:
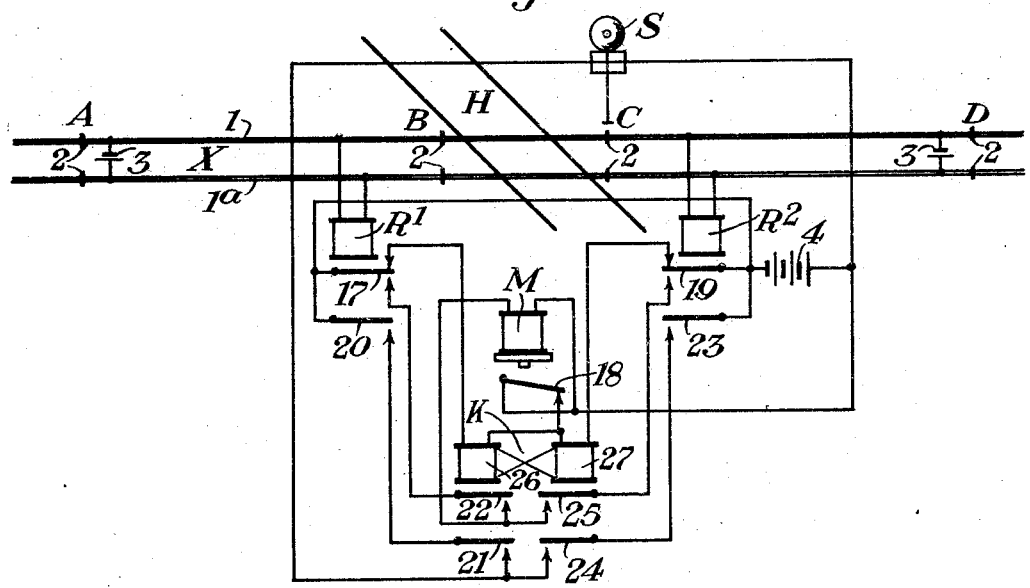

In the accompanying drawings, Fig. 1 is a diagrammatic view of one form of apparatus embodying my invention. Fig. 2 is a similar view showing a modification of a portion of the apparatus shown in Fig. 1 and also embodying my invention.

Similar reference characters refer to similar parts in each of the two views.

Referring first to Fig. 1, the rails 1 and $1^a$ of a stretch of railway track X are divided by insulated joints 2 into sections A—B and C—D, one in each direction from a highway crossing H. A track relay R, having a distinguishing exponent, according to its location, is connected across the rails 1 and $1^a$ at one end of each of the sections A—B and C—D, and a track battery 3 is connected across the rails at the other end of each of these sections. The highway crossing H is protected by a signal S, of any suitable type such, for example, as a bell or light signal or a combination of both, which signal is controlled in part by an interlocking relay K having a pair of windings 26 and 27, and in part by a first thermal relay $T^1$ and a second thermal relay $T^2$ having contacts 12 and 16, respectively, each of which is open when its relay is deenergized, and closes after its relay becomes energized.

Under normal conditions, the track relays $R^1$ and $R^2$ and both windings of the interlocking relay K are all energized and the thermal relays $T^1$ and $T^2$ are both deenergized. The winding 26 of the relay K is energized by virtue of a stick circuit passing from a battery 4, through front contact 5 of track relay $R^1$, winding 26 of relay K, and front or "flagman" contact 6 of this relay back to battery 4. The winding 27 of relay K is also energized by a stick circuit passing from battery 4, through front contact 7 of track relay $R^2$, winding 27 of relay K, and front or "flagman" contact 8 of this relay back to battery 4.

I will now assume that an eastbound car or engine, that is, a car or engine moving toward the right as shown in the drawings, enters section A—B and causes the deenergization of track relay $R^1$. This opens front contact 5 of relay $R^1$ and interrupts the stick circuit just traced through this contact for winding 26 of interlocking relay K. The deenergization of winding 26 establishes a signal circuit passing from battery 4, through back contact 9 of track relay $R^1$, back contact 10 of relay K and operating mechanism of signal S back to battery 4, thereby causing the signal S to give warning to traffic on the highway H of the approaching car or engine.

When the car departs from section A—B, the track relay $R^1$ again becomes energized and opens its back contact 9, thereby interrupting the signal circuit previously traced through this contact and discontinuing the operation of the signal S. The energization of track relay $R^1$ establishes a circuit passing from battery 4, through front contact 11 of track relay $R^1$, heating element $t$ of thermal relay $T^1$, and back contact 6 of relay K back to battery 4. The relay $T^1$, however, is slow acting in character and does not immediately close its contact 12.

The car next enters section C—D and causes the deenergization of track relay $R^2$, thereby causing this relay to open its front contact 7 and interrupt the circuit for winding 27 of relay K previously traced through this contact. The relay K, however, being of the interlocking type, the contacts operated by the winding 27 are prevented from closing at their back points, and flagman contact 8 is prevented from opening at its front point. At the expiration of a predetermined interval of time, which is of sufficient duration to permit the car to traverse the section of track between the points B and C at the crossing and to enter section C—D, the thermal relay $T^1$ functions and establishes a pick-up circuit for winding 26 of relay K passing from battery 4, through front contact 5 of relay $R^1$, winding 26 of relay K, and contact 12 of relay $T^1$ back to battery 4. This causes the energization of winding 26 of relay K and reestablishes the stick circuit for this winding previously traced through its front contact 6, and opens the circuit for thermal relay $T^1$ previously traced through back contact 6 of winding 26. As soon as the heating element of relay $T^1$ cools, contact 12 of this relay opens, thereby interrupting the pick-up circuit for winding 26 of relay K previously traced through this contact. When the car departs from section C—D, track relay $R^2$ again becomes energized and closes its front contact 7, thereby causing the reenergization of winding 27 of relay K by virtue of the stick circuit previously traced through front contact 8 of this relay which was maintained closed while winding 27 was deenergized by the interlocking character of this relay. The apparatus is thus restored to its normal condition.

I will now assume that a westbound car or engine enters section C—D and causes the deenergization of track relay $R^2$. This opens front contact 7 of this relay and interrupts the stick circuit previously traced through this contact for winding 27 of interlocking relay K. The deenergization of winding 27 establishes a signal circuit passing from battery 4, through back contact 13 of relay $R^2$, back contact 14 of winding 27 and operating mechanism of signal S back to battery 4, thereby causing the signal to give warning to traffic on the highway H of the approaching westbound car.

When the car departs from section C—D, the track relay $R^2$ again becomes energized and opens its back contact 13, thereby interrupting the signal circuit previously traced through this contact and discontinuing the operation of signal S. The energization of track relay $R^2$ also establishes a circuit passing from battery 4, through front contact 15 of track relay $R^2$, heating element $t$ of thermal relay $T^2$, and back contact 8 of relay K back to battery 4. The relay $T^2$, however, is also slow-acting in character and does not immediately close its contact 16.

The car next enters section A—B and causes the deenergization of track relay $R^1$, thereby causing this relay to open its front contact 5 and interrupt the circuit previously traced through this contact for winding 26 of relay K. The relay K, however, being of interlocking character and the winding 27 thereof being still in a deenergized condition, is prevented thereby from closing its back contacts 6 and 10 and also from opening its front or "flagman" contact 6. At the expiration of a predetermined time interval, which is of sufficient duration to permit the car to traverse the section of track between the points B and C at the crossing and to enter section A—B, the thermal relay $T^2$ functions and establishes a pick-up circuit for winding 27 of relay K passing from battery 4, through front contact 7 of relay $R^2$, winding 27 of relay K, and contact 16 of relay $T^2$ back to battery 4. This causes the energization of winding 27 and reestablishes the stick circuit for this winding previously traced through its front contact 8, and opens the circuit for thermal relay $T^2$ previously traced through back contact 8. As soon as the heating element of relay $T^2$ cools, contact 16 of this relay opens, thereby interrupting the pick-up circuit for winding 27 previously traced through this contact.

When the car departs from section A—B, track relay $R^1$ again becomes energized and closes its front contact 5, thereby causing the reenergization of winding 26 of relay K by virtue of the stick circuit previously traced through front contact 6 of this relay which was maintained closed while winding 27 was deenergized. The apparatus is thus restored to its normal position.

By means of the above described construction, the thermal relays $T^1$ and $T^2$ delay the reenergization of the windings 26 and 27 of the interlocking relay K until after a car approaching the crossing from either direction has departed from one of the sections, has traversed the section between the points B and C at the crossing, and has entered the other section, notwithstanding the fact that the track relay of the section from which the car has departed has again become energized. This delay in the reenergization of one of the windings of the interlocking relay until after the other has become deenergized prevents the winding last deenergized from establishing the signal circuit controlled thereby. As a result, the signal S will not be reenergized by a car entering either of the sections from the territory between the sections.

In Fig. 2 I have shown a modified form of my invention in which I employ a single normally deenergized slow releasing relay M instead of the thermal relays $T^1$ and $T^2$. In this construction, the windings 26 and 27 of the interlocking relay K are both normally energized by virtue of circuits one of which passes from battery 4, through front contact 17 of track relay $R^1$, winding 26 of relay K, and back contact 18 of slow releasing relay M back to battery 4, and the other of which passes from battery 4, through front contact 19 of track relay R², winding 27 of relay K, and back contact 18 of slow releasing relay M, back to battery 4.

If an eastbound car should now enter section A—B, track relay R¹ will become deenergized and open its front contact 17, thereby causing the deenergization of winding 26 of relay K. This will establish a signal circuit passing from battery 4, through back contact 20 of track relay R¹, back contact 21 of relay K, and operating mechanism of signal S back to battery 4. The signal S will consequently become energized and will give warning to traffic on the highway of the approach of the car. The deenergization of track relay R¹ and winding 26 of relay K also establishes a circuit for slow releasing relay M, passing from battery 4, through back contact 17 of track relay R¹, back contact 22 of interlocking relay K, and winding of slow-releasing relay M back to battery 4. The energization of relay M opens its back contact 18 and thus not only opens the circuit for winding 26 of relay K at another point but also interrupts the circuit for winding 27 of this relay previously traced through this contact. Now, inasmuch as the relay K is of the interlocking type, the previous deenergization of winding 26 prevents the back contacts controlled by winding 27 from closing when it is thus subsequently deenergized, and consequently, the circuit for signal S controlled by winding 27 is not established.

As soon as the car departs from section A—B, the track relay R¹ picks up its contacts 17 and 20 and thus interrupts both the signal circuit and the circuit for the relay M but the relay M being of slow releasing character, does not immediately respond.

The car next enters section C—D and causes the deenergization of track relay R² thereby opening front contact 19 of this relay and interrupting the circuit for winding 27 at another point. The slow releasing relay M now closes its back contact 18 and reestablishes the circuit for winding 26 previously traced through this contact. The closing of back contact 18 of relay M does not, however, reestablish the circuit for winding 27 for the reason that front contact 19 of track relay R² is now open. The winding 27 of relay K, therefore, remains deenergized, as before, with its back contacts held open by reason of its interlocking character.

When the car departs from section C—D, track relay R² again becomes energized and closes its front contact 19, thereby reestablishing the circuit for winding 27 previously traced through this contact. The apparatus is thus restored to its normal condition.

The operation of the apparatus for a westbound car is identical with that hereinbefore described in connection with eastbound traffic except in a reverse order. If a westbound car enters section C—D, the track relay R² becomes deenergized and opens its front contact 19, thereby causing the deenergization of winding 27 of relay K. This establishes a signal circuit passing from battery 4, through back contact 23 of track relay R², back contact 24 of interlocking relay K, and operating mechanism for signal S back to battery 4. The signal S will consequently become energized and warn traffic in the vicinity of the crosing H of the approach of the westbound car. The deenergization of track relay R² and winding 27 of relay K also establishes a circuit for slow releasing relay M passing from battery 4, through back contact 19 of track relay R², back contact 25 of interlocking relay K, and winding of slow releasing relay M, back to battery 4. The energization of relay M opens its back contact 18 and so not only opens the circuit for winding 27 of relay K at another point but also interrupts the circuit for the winding 26 previously traced through this contact. The winding 26 of relay K is, however, prevented from closing its back contacts 21 and 22 when thus deenergized, by reason of the previous deenergization of winding 27 of this relay, and consequently, the circuit for signal S controlled by winding 26 of relay K is not established.

As soon as the car departs from section C—D, the track relay R² picks up its contacts 19 and 23 and thus interrupts both the signal circuit and the circuit for relay M but the relay M, being slow releasing in character, as has been hereinbefore stated, does not immediately respond.

The car next enters section A—B and causes the deenergization of track relay R¹, thereby opening front contact 17 of this relay and interrupting the circuit for winding 26 of relay K at another point. The slow releasing relay M now closes its back contact 18 and reestablishes the circuit for winding 27 previously traced through this contact. The closing of back contact 18 of relay M does not, however, reestablish the circuit for winding 26 for the reason that front contact 17 of track relay R¹ is now open. The winding 26 of relay K, therefore, remains deenergized as before, with its back contacts held open by reason of the interlocking characteristics of this relay.

When the car departs from section A—B, track relay R¹ again becomes energized and closes its front contact 17, thereby reestablishing the circuit for winding 26 previously traced through this contact. The apparatus is thus restored to its normal condition.

As in the case of the thermal relays T¹ and T² described in connection with the apparatus shown in Fig. 1, the slow releasing relay M delays the energization of the windings 26 and 27 of relay K until after a car has departed from either one of the sections A—B or C—D, has traversed the space between these sections, and has entered the other of these sections. The signal S is, therefore, prevented from being operated again by the entry of a car into a section after it has passed over the crossing H.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a stretch of railway track divided into two spaced sections, a signal, a first signal operating means operable by a car entering said first section, a second signal operating means operable by a car entering said second section, a third signal operating means operable by said first and second signal operating means, and means operable by said first and second signal operating means for preventing an operation of said third signal operating means during the time required for a car to pass from either section to the other.

2. In combination, a stretch of railway track divided into a first section and a second section separated from one another by a third section, a signal, a first relay operable by a car entering said first section for operating said signal, a second relay operable by a car entering said second section for operating said signal, a third relay operable by said first and second relays for operating said signal jointly with said first and second relays, and means operable by said first and second relays for preventing an operation of said third relay during the time required for a car to pass from either section to the other.

3. In combination, a stretch of railway track divided into a first section and a second section separated from one another, a signal, a first track relay operable by a car entering said first section for operating said signal, a second track relay operable by a car entering said second section for operating said signal, an interlocking relay operable by said first and second track relays for operating said signal jointly with said first and second track relays, and means operable by said first and second track relays for preventing an operation of said interlocking relay during the time interval required by a car moving from said first section toward said second section at a normal rate of speed to traverse the space between said sections.

4. In combination, a stretch of railway track divided into a first section and a second section separated from said first section by a stretch of track intersected by a highway, a signal for controlling traffic over said highway at such intersection, a first track relay associated with said first section for controlling said signal for railway traffic moving in one direction, a second track relay associated with said second section for controlling said signal for railway traffic moving in an opposite direction, an interlocking relay controlled by said first and second track relays for controlling said signal jointly with said track relays, and means controlled by said first and second track relays for delaying the operation of said interlocking relay for the time interval required by a car moving from one of said sections toward the other to traverse the stretch between said sections.

5. In combination, a stretch of railway track divided into a first section and a second section separated by a stretch of track intersected by a highway, a signal for controlling traffic on said highway at such intersection, a first track relay associated with said first section, a second track relay associated with said second section, an interlocking relay controlled jointly by said first and second track relays, a first circuit for said signal controlled by said first track relay and by said interlocking relay, a second circuit for said signal controlled by said second track relay and by said interlocking relay, and means controlled jointly by said first and second track relay for delaying the operation of said interlocking relay during the time required for a car to traverse the stretch of track between said sections.

6. In combination, a stretch of railway track divided into a first section and a second section separated from said first section by a stretch of track intersected by a highway, a signal for controlling traffic over said highway at such intersection, a first track relay associated with said first section for controlling said signal for railway traffic moving over said stretch in one direction, a second track relay associated with said second section for controlling said signal for railway traffic moving over said stretch in an opposite direction, a first time element relay controlled by said first track relay, a second time element relay controlled by said second track relay, and an interlocking relay controlled by said first and second track relays and by said time element relays for controlling said signal jointly with said track relays, the characteristics of said time element relays being such as to prevent operation of said interlocking relay during the time required for a car to traverse the stretch of track between said sections.

7. In combination, a stretch of railway track divided into a first section and a second section separated by a stretch of track intersected by a highway, a signal for controlling traffic over said highway at such intersection, a first track relay for said first section, a second track relay for said second section, an interlocking relay, a first time element relay, a second time element relay, a first circuit for said signal controlled by said first track relay and by said interlocking relay, a second circuit for said signal controlled by second track relay and by said interlocking relay, a first pick-up circuit for said interlocking relay controlled by said first track relay and by said first time element relay, a first stick circuit for said interlocking relay controlled by said first track relay. a second pick-up circuit for said interlocking relay controlled by said second track relay and by said second time element relay, a second stick circuit for said interlocking relay controlled by said second track relay, a circuit for said first time element relay controlled by said first track relay and by said interlocking relay, and a circuit for said second time element relay controlled by said second track relay and by said interlocking relay.

8. In combination, a stretch of railway track divided into a first section and a second section separated from said first section by a stretch of track intersected by a highway, a signal for controlling traffic over said highway at such intersection, a first track relay associated with said first section for controlling said signal for railway traffic moving over said stretch in one direction, a second track relay associated with said second section for controlling said signal for railway traffic moving over said stretch in an opposite direction, a slow acting relay controlled jointly by said first and second track relays, and an interlocking relay controlled jointly by said first and second track relays and by said slow acting relay for controlling said signal jointly with said track relays.

9. In combination, a stretch of railway track intersected by a highway, said track being divided to form two spaced sections extending in opposite directions from the highway, a track relay for each section, an interlocking relay having two magnets controlled by said two track relays respectively, means operating when a car passes from either section to the other to delay the re-energization of the magnet controlled by the track relay for the section which the car is leaving until the car has entered the other setcion, and a highway crossing signal located at said intersection and controlled by said interlocking relay.

In testimony whereof I affix my signature.

PAUL H. CRAGO.